(12) United States Patent
Zakrzewski

(10) Patent No.: US 7,777,190 B2
(45) Date of Patent: Aug. 17, 2010

(54) DRIVE SYSTEM FOR SCANNING DEVICE AND METHOD OF SCANNING A PATIENT

(75) Inventor: Edward Zakrzewski, Carol Stream, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/950,012

(22) Filed: Dec. 4, 2007

(65) Prior Publication Data

US 2009/0140152 A1 Jun. 4, 2009

(51) Int. Cl.
*G01T 1/166* (2006.01)
(52) U.S. Cl. .................................. 250/363.05
(58) Field of Classification Search ............ 250/363.03, 250/363.05, 363.08, 394, 370.09
See application file for complete search history.

(56) References Cited

U.S. PATENT DOCUMENTS

| | | | | |
|---|---|---|---|---|
| 5,569,924 A * | 10/1996 | Plummer | ................ | 250/363.05 |
| 2005/0269514 A1* | 12/2005 | Stark | ...................... | 250/363.08 |
| 2006/0214110 A1* | 9/2006 | Kojima et al. | ................ | 250/394 |
| 2008/0073541 A1* | 3/2008 | Vija et al. | .............. | 250/363.05 |
| 2008/0135768 A1* | 6/2008 | Chang | ................... | 250/363.04 |

* cited by examiner

*Primary Examiner*—David P Porta
*Assistant Examiner*—Faye Boosalis
(74) *Attorney, Agent, or Firm*—Peter L. Kendall

(57) ABSTRACT

A scanning device and a drive system for a scanning device having a first detector and a second detector are provided, which include a base and a mounting plate movably supported by the base. The mounting plate is configured to movably support the first detector and the second detector. The drive system also includes a drive device configured to move the mounting plate with respect to the base, and a linear actuator configured to move the second detector with respect to the mounting plate.

21 Claims, 9 Drawing Sheets

DRIVE SYSTEM FOR SCANNING DEVICE AND METHOD OF SCANNING A PATIENT

BACKGROUND

1. Field of the Invention

An embodiment of the present invention relates to the field of patient scanning devices.

2. Discussion

Cardiac scanners provide a non-invasive manner in which to gather information used to aid in the diagnoses of current or possible future health problems associated with a patient's heart. For example, cardiac scanners can employ a Single Photon Emission Computed Tomography (SPECT) scan to generate a detailed image of the patient's heart. In a SPECT scan, a radionuclide is injected intravenously into a patient, and, as the radionuclide is circulated in the blood, the tissues absorb the radionuclide. Then, a detector (camera) is used to scan the portion of the patient that is of interest in the examination, and the detector detects photons of the radionuclide particles, and this information is transferred to a computer that converts this information into cross-sections of the patient and generates a 3-D image of the patient from the cross-sections.

Several dedicated cardiac scanners are available in the marketplace that utilize various detectors and drive systems in order to scan the torso of a patient in order to generate images of the patient's heart. Generally, such dedicated cardiac scanners use one or more detectors to capture multiple images about a certain angular circumferential range of the patient's torso, and these images are combined to form the 3-D image of the patient's heart.

One example of such a cardiac scanner, namely a C.cam™ scanner made by Siemens, is shown in FIGS. 1A and 1B. FIG. 1A is a perspective view of the Siemens scanner 10, and FIG. 1B is a perspective view of the scanner 10 with a patient thereon in a patient scanning position, which is close to horizontal. This scanner 10 includes a camera having two detectors integrated into one housing 12. The motion of the detectors about the patient's torso during scanning is provided by an articulated arm 14 powered about three drive axes. The articulated arm 14 moves the detectors around the patient's body following the contour thereof.

Another example of a cardiac scanner is made by Spectrum Dynamics. FIG. 2 is a cross-sectional, schematic representation of a scanning unit 20 of the Spectrum Dynamics scanner. In this scanner, the scanning unit 20 is moved into position with respect to the patient's body 26 prior to scanning using two drive axes (not shown), and then scanning takes place with a housing 22 of the scanning unit 20 remaining in a stationary position. The scanning unit 20 includes multiple detectors 24 that rotate (or wiggle) back and forth (two positions are depicted for each detector in FIG. 2) in order to scan the patient. Thus, during scanning, the multiple detectors 24 inside the stationary housing 22 wiggle slightly around their own axes scanning the patient's body in a sweeping motion.

Yet another example of a cardiac scanner is made by CardiArc. FIG. 3 is a schematic, perspective view of a detector unit 30 and an oscillating aperture arc 34 of a scanning unit of the CardiArc scanner. This scanner has a half donut shaped enclosure (not shown) that is positioned about the torso of the patient. The detector unit 30 is mounted in a stationary position within the enclosure, and the detector unit 30 has multiple detector boards 32 mounted in a spaced apart relationship to one another along the detector unit 30. The multiple stationary detector boards 32 are arrayed in a 180° arc surrounding the patient's torso. The aperture arc 34 is a thin sheet of lead having spaced apart apertures 36. During scanning, all of the detector boards are active simultaneously, and the aperture arc 34 is rotated slightly back and forth to produce multiple rays sweeping across each of the detector board's field of view, thereby providing an acquisition of data.

SUMMARY

The disclosure advantageously provides a drive system for a scanning device having a first detector and a second detector, where an embodiment of which includes a base and a mounting plate movably supported by the base. The mounting plate is configured to movably support the first detector and the second detector. The drive system also includes a drive device configured to move the mounting plate with respect to the base, and a linear actuator configured to move the second detector with respect to the mounting plate.

The disclosure also advantageously provides a drive system for a scanning device having a first detector and a second detector, where an embodiment of which includes a base configured to extend about a patient receiving area and a mounting plate movably supported by the base, where the mounting plate is configured to movably support the first detector and the second detector. The drive system also includes a drive device configured to move the mounting plate with respect to the base about a portion of a perimeter of the receiving area, and structure for adjusting a scanning travel path of one or more of the first and second detectors as the mounting plate moves about the portion of the perimeter depending upon a size of a patient to maintain substantially constant distances between a face of each of the first and second detectors and a body of the patient regardless of the size of the patient.

The disclosure further advantageously provides a scanning device, where an embodiment of which includes a base, a mounting plate movably supported by the base, a first detector movably supported by the mounting plate, and a second detector movably supported by the mounting plate. The scanning device also includes a drive device configured to move the mounting plate with respect to the base, and a linear actuator configured to move the second detector with respect to the mounting plate.

The disclosure additionally advantageously provides a method of scanning a patient, where an embodiment of which includes providing a mounting plate movably supported by a base extending about a patient receiving area, providing a first detector and a second detector movably supported by the mounting plate, moving the mounting plate with respect to the base about a portion of a perimeter of the receiving area, scanning the patient as the mounting plate is moving about the portion of the perimeter of the receiving area, and adjusting a scanning travel path of one or more of the first and second detectors when the mounting plate moves about the portion of the perimeter depending upon a size of the patient to maintain substantially constant distances between a face of each of the first and second detectors and a body of the patient regardless of the size of the patient.

BRIEF DESCRIPTION OF THE DRAWINGS

A more complete appreciation of the disclosure and many of the attendant advantages thereof will become readily apparent with reference to the following detailed description, particularly when considered in conjunction with the accompanying drawings, in which.

DETAILED DESCRIPTION OF EXEMPLARY EMBODIMENTS

Figure 1A:
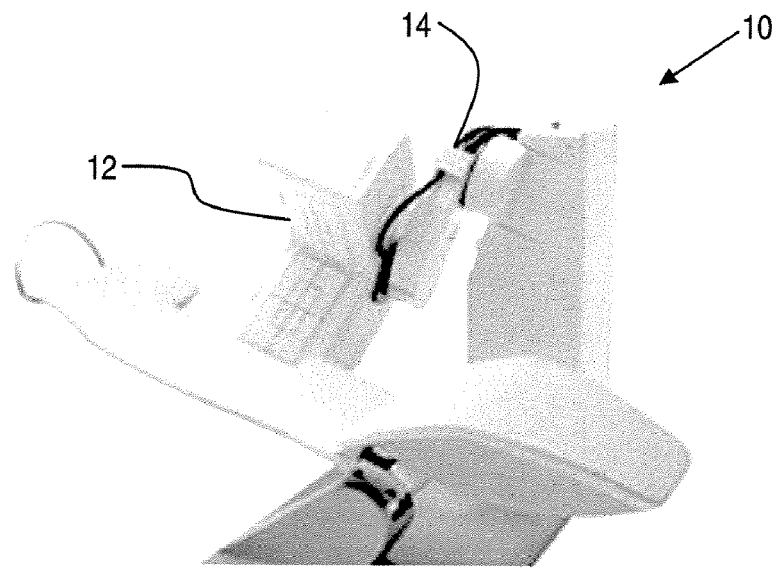
FIG. 1A is a perspective view of a first related art dedicated cardiac scanner.
Figure 1B:
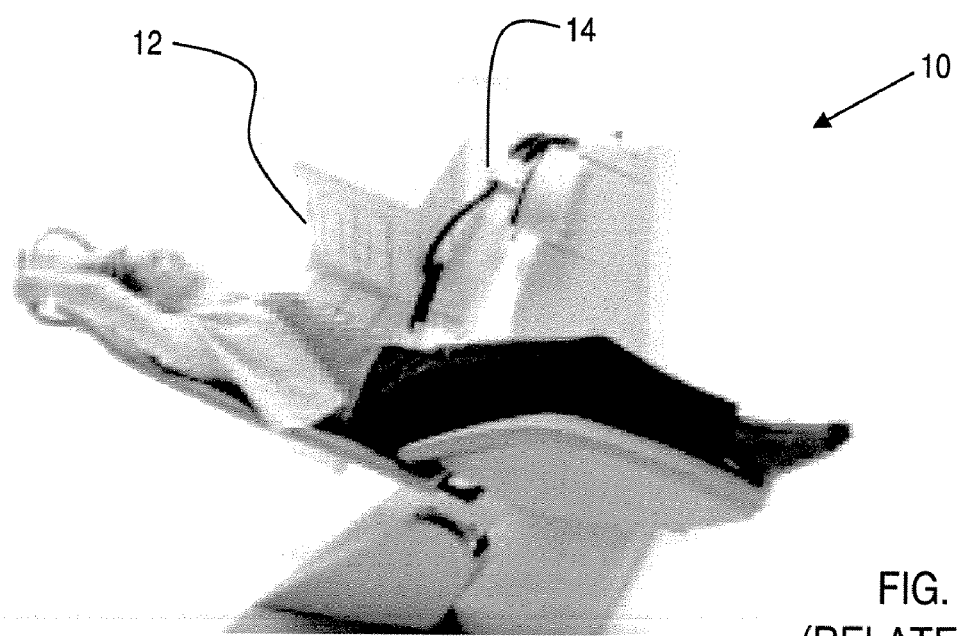
FIG. 1B is a perspective view of the scanner in FIG. 1A with a patient thereon in a patient scanning position.
Figure 2:
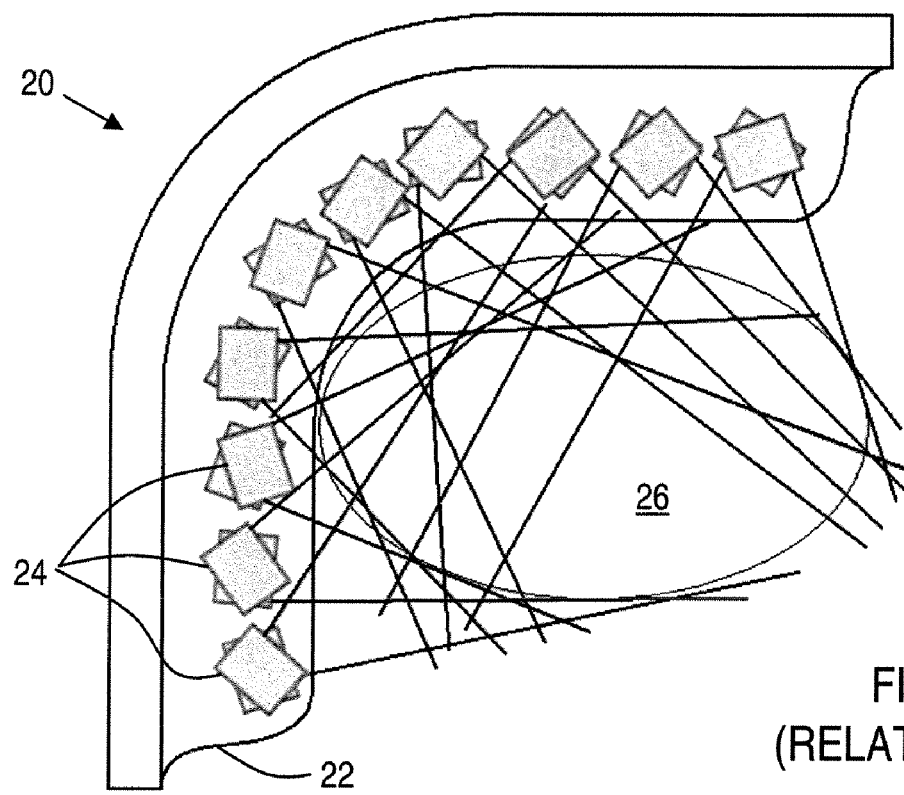
FIG. 2 is a cross-sectional, schematic representation of a scanning unit of a second related art dedicated cardiac scanner.
Figure 3:
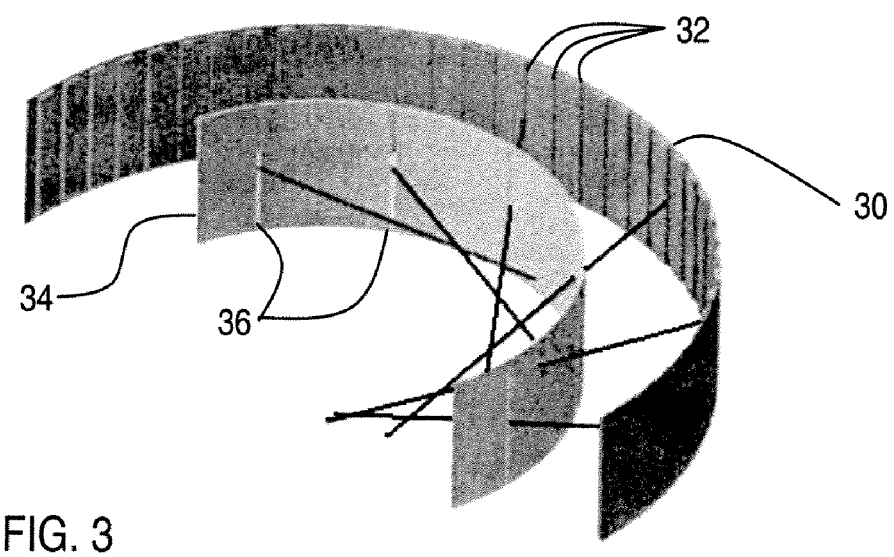
FIG. 3 is a schematic, perspective view of a detector unit and an oscillating aperture arc of a scanning unit of a third related art dedicated cardiac scanner.

Embodiments of the present invention will be described hereinafter with reference to the accompanying drawings. In the following description, the constituent elements having substantially the same function and arrangement are denoted by the same reference numerals, and repetitive descriptions will be made only when necessary.

The scanner and drive system depicted in FIGS. 4A-10 provide a device that enables scanning of different sized patients with a minimum distance between the patient's body and the scanner using a simple and effective drive system. The embodiment depicted provides a drive system for managing two individual detectors (e.g., camera heads) that enables the detectors to conform to different patient sizes from small to large with a minimum distance between camera face and patient body. The drive system is implemented using a semi-circular orbit track and radial motion governed by a linear actuator and a stationary cam track. The drive system is particularly well suited for use in dedicated cardiac scanners where the patient is in a substantially upright position, although the drive system could also be used in other scanning devices and other patient orientations.

Figure 4A:
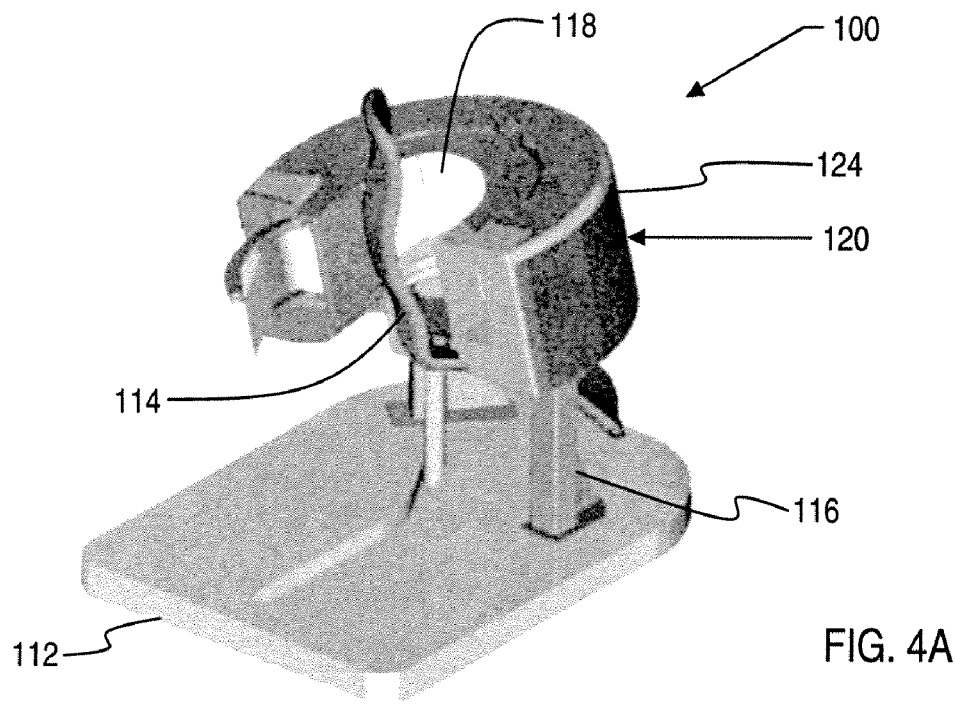
FIG. 4A is a rear perspective view of a cardiac scanner according to an embodiment of the present invention.
Figure 4B:
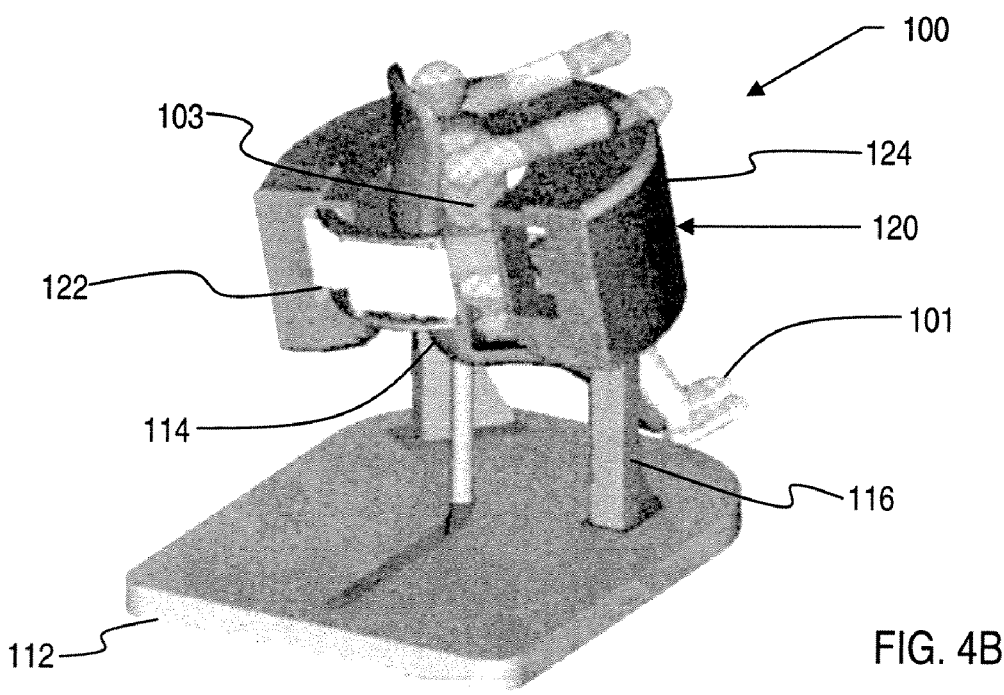
FIG. 4B is a rear, perspective view of the embodiment of the cardiac scanner in FIG. 4A shown with a patient in a patient scanning position.
Figure 5:
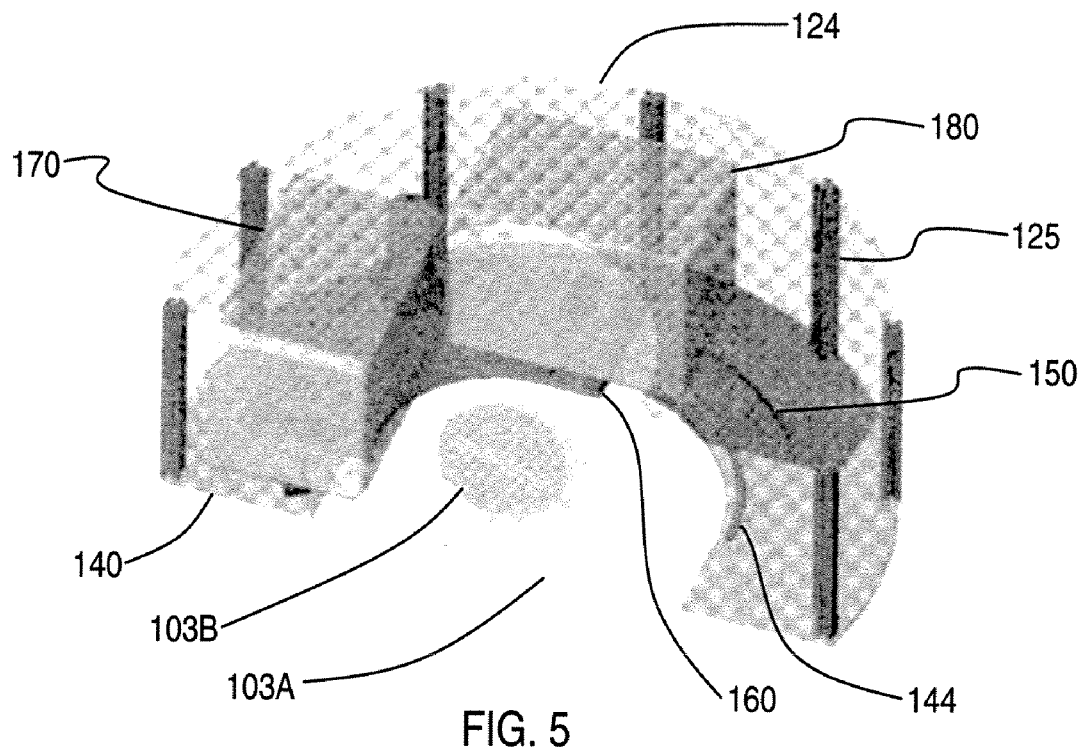
FIG. 5 is a rear perspective, schematic view of an embodiment of a drive system for a cardiac scanner according to an embodiment of the present invention.
Figure 6:
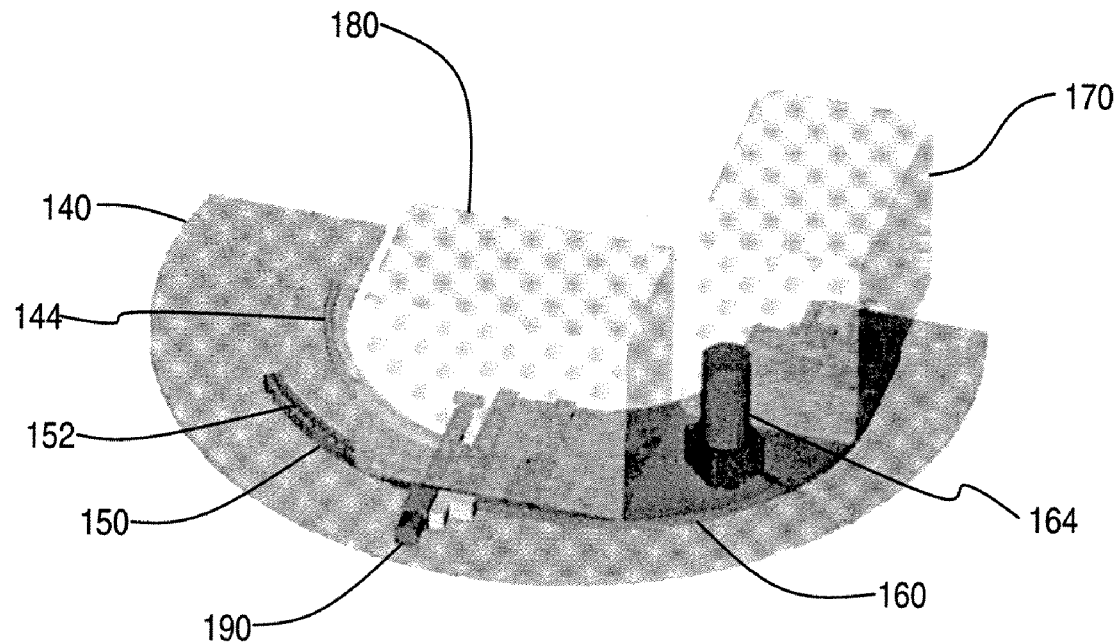
FIG. 6 is a front perspective, schematic view of the embodiment of the drive system in FIG. 5.
Figure 7:
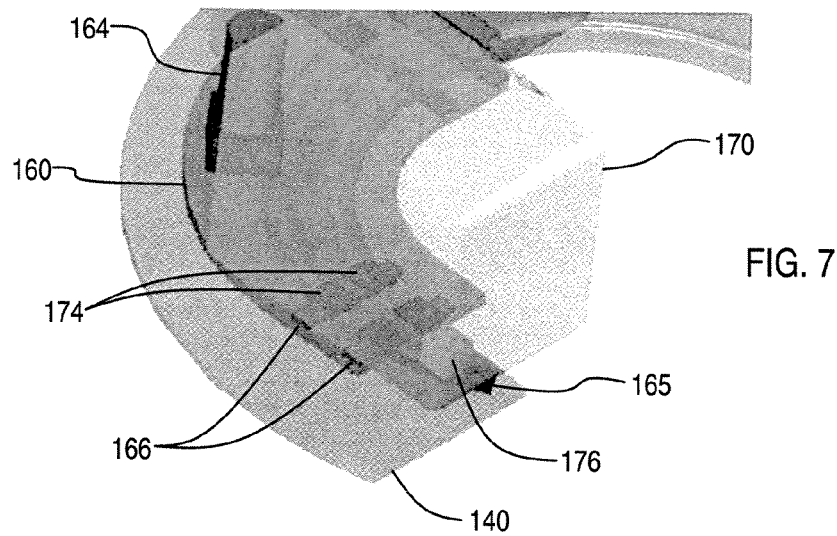
FIG. 7 is a partial, enlarged, rear perspective, schematic view of the embodiment of the drive system in FIG. 5.

FIG. 4A is a rear perspective view of a scanning device 100 according to an embodiment of the present invention, and FIG. 4B is a rear, perspective view of the embodiment in FIG. 4A shown with a patient in a patient scanning position. The embodiment depicted in FIGS. 4A and 4B is a dedicated cardiac scanner; however, the invention set forth herein can be embodied in various different types of scanning equipment.

The scanning device 100 includes a base support 112 with a patient chair 114 in which a patient 101 can be seated during the scanning procedure. The scanning device 100 also includes a pair of braces 116 that mount a scanning unit 120 to the base support 112. The scanning unit 120 can be configured to partially or completely encircle a patient receiving area 118, where the patient 101 sits during the scanning procedure in the chair 114. Additionally, the scanning unit 120 can include an attenuation correction wing 122 that can be opened and closed to allow entry and exit of the patient 101. The chair 114 is slidably supported by the base support 112 so that it can be moved along a channel in the base support 112 in order to move the patient 101 on the chair into position within the patient receiving area 118 and/or in order to adjust the location of the chair 114 with respect to the scanning unit 120 depending on the size of the patient 101.

The embodiment of the scanning device 100 depicted in FIGS. 4A and 4B therefore provides a scanning unit 120 with a generally half-donut shaped enclosure, which has two detectors housed therein, that is provided around the patient chair 114. The patient chair 114 provides a patient position during the scanning procedure that is almost vertical with a slightly rearward reclining angle. The scanning device 100 implements two individual detectors 170 and 180 (shown in subsequent figures) that are driven about a perimeter of the patient receiving area 118 by a drive system during the scanning procedure. Preferably, the detectors are provided within a housing, such as outer housing 124, such that motion of the detectors inside the housing enclosure is not apparent to the patient 101 during the scanning procedure.

As can be seen in FIGS. 5-9G, the scanning unit 120 also includes a base plate (or "base") 140 mounted in a stationary position within the outer housing 124. The base 140 has an inner surface 142 that is generally U-shaped (as can be seen, for example, in FIG. 8A) and defines and/or is located at abouts the patient receiving area 118. The base plate 140 supports an orbit drive system and the two individual detectors 170 and 180, and allows for radial motion of detectors 170 and 180 during the orbital drive of the detectors 170 and 180 about the patient receiving area 118. The cardiac scanner provides the capability to adjust the orbit of the detectors to allow for the scanning of different sizes of patients, while maintaining a close distance between camera faces of the detectors and the patient. For example, FIGS. 8A-8G depict the scanning of a patient 101 with a large torso 103 as represented by large ellipse 103A, and FIGS. 9A-9G depict the scanning of a patient 101 with a small torso 103 as represented by small ellipse 103B. The scanner advantageously provides for independent radial motion by each detector.

The base 140 has a guide rail 144 mounted on an upper surface thereof in a stationary position. The guide rail 144 extends from a first end 146 thereof to a second end 148 thereof and is general semi-circular in shape. A stationary, arc-shaped gear rack 150 is mounted to the upper surface of the base plate 140. The gear rack 150 has gear teeth 152 on a surface thereof.

The scanning unit 120 further includes a mounting plate 160 that is movably supported by the base plate 140. The mounting plate 160 has bearings 162 attached to a bottom surface thereof that are used to slidably mount the mounting plate 160 to the guide rail 144 mounted to the base plate 140, such that the mounting plate 160 can slide along the guide rail 144. A drive device 164, such as an electric motor, is mounted to the mounting plate 160 and is configured to move the mounting plate 160 with respect to the base plate 140 along the guide rail 144. The drive device 164 includes a rotatable gear (not shown) that meshes with the teeth 152 of the gear rack 150 in order to drive the mounting plate 160 along the guide rail 144 when the rotatable gear of the drive device 164 is rotated. Preferably, the guide rail 144 and bearings 162 allow the mounting plate 160 (and thus the detectors mounted thereon) to pivot or orbit around the patient 101 in the patient receiving area 118 by about 100°. The drive device 164 and gearing are preferably capable of making a single pass in one direction through the 100° in ten seconds, thus enabling the scanner to perform a scanning acquisition procedure in a total time of less than four minutes.

The base plate 140 supports an orbit drive system. The mounting plate 160 is configured to movably support the first detector 170 and the second detector 180 using linear bearings. The two individual detectors 170 and 180 are mounted on the mounting plate 160 using linear bearings that allow for the radial motion of detectors. The mounting plate is configured to movably support the first detector 170 such that the first detector 170 can linearly slide on the mounting plate 160 toward and away from the patient receiving area 118, and the mounting plate 160 is configured to movably support the second detector 180 such that the second detector 180 can linearly slide on the mounting plate 160 toward and away from the patient receiving area 118.

The first detector 170 has bearings 174 mounted thereto. The bearings 174 are slidably mounted on linear bearing rails 166, which are fixedly mounted to the mounting plate 160. Thus, the bearings 174 of the first detector 170 can slide linearly along the linear bearing rails 166. The upper surface of the base plate 140 has a cam device 165 that includes a cam track 167 that extends in an arc shape about a portion of the patient receiving area 118. The lower surface of the first detector 170 has a cam follower 176 mounted thereto by a mounting block, and the cam follower 176 is received within and guided by the cam track 167. The cam track 167 and the cam follower 176 interact to linearly slide the first detector 170 on the mounting plate 160 toward and away from the patient receiving area 118 when the mounting plate 160 moves along the base 140 about the patient receiving area 118.

The second detector 180 has bearings 184 mounted thereto. The bearings 184 are slidably mounted on linear bearing rails 168, which are fixedly mounted to the mounting plate 160. Thus, the bearings 184 of the second detector 180 can slide linearly along the linear bearing rails 168. The mounting plate 160 has a linear actuator 190 mounted thereto that includes an extendable rod 192 attached to the second detector 180. The actuator 190 can extend and retract the rod 192 in order to slide the second detector 180 linearly on the mounting plate 160 toward and away from the patient receiving area 118 as desired when the mounting plate 160 moves along the base 140 about the patient receiving area 118.

The detectors 170 and 180 are thus mounted on linear bearings orientated radially toward the torso of the patient 101. This arrangement allows for the controlled movement of each detector toward and away from the patient body depending on the patient's size. The radial motion of the first detector 170 is controlled by a stationary cam track 167 and a cam follower 176, while the radial motion of the second detector 180 is delivered by the linear actuator 190. The actuator 190 is attached on one end to the mounting plate 160 and on the other end to the bottom of the second detector 180.

The radial motion of the first detector 170 is fixed by the shape of the cam track 167 and accommodates any patient size without providing different scanning travel paths for different patient sizes. Thus, as can be seen by comparing FIGS. 8A-8G with FIGS. 9A-9G, the base 140 and the drive device 164 are configured to move the first detector 170 along a same scanning travel path when the mounting plate 160 moves with respect to the base 140 about the patient receiving area 118 regardless of the size of the patient received in the patient receiving area 118. The orbital motion of first detector 170 is always the same regardless of patient size, because patients are always biased against a side of the patient receiving area 118 that is adjacent to the first detector 170. Thus, the patient's profile adjacent to a front camera face 172 of the first detector 170 does not change much during the orbital motion and therefore the distance between the face 172 and the patient's torso does not change much during the orbital motion, thereby allowing for the use of a uniform radial motion of the first detector 170 regardless of the patient size.

The radial motion of the second detector 180 is variable and has a different pattern depending on the patient size. Thus, as can be seen by comparing FIGS. 8A-8G with FIGS. 9A-9G, the linear actuator 190 is configured to move the second detector 180 along a different scanning travel path when the mounting plate 160 moves with respect to the base 140 about the patient receiving area 118 depending upon a size of a patient in the patient receiving area 118.

FIGS. 8A-8G and 9A-9G depict how patients 101 having torsos 103 with cross-sections of different sizes (e.g., a large size as represented by ellipse 103A in FIGS. 8A-8G, or a small size as represented by ellipse 103B in FIGS. 9A-9G) can be accommodated during scanning procedures by utilizing the linear actuator 190 for the second detector 180, which drives the second detector 180 to a required position in a radial direction about the patient receiving area 118 to follow the patient's body profile.

Figure 8A:
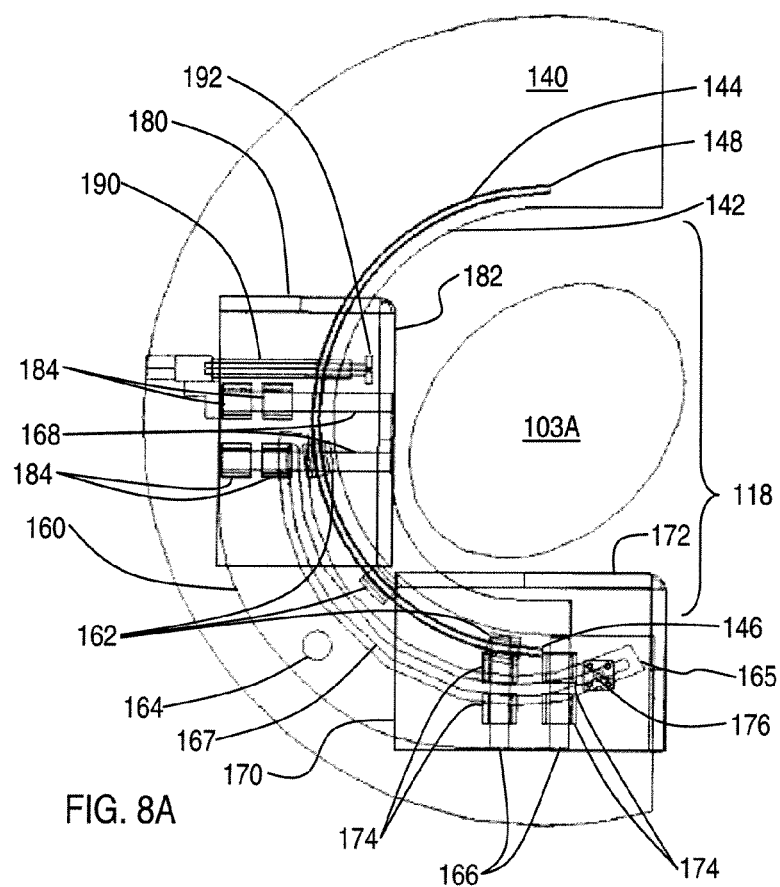
FIG. 8A is a top plan, schematic view of the embodiment of the drive system in FIG. 5, shown used with a patient having a large cross-section and shown with detectors at a 0° orbit position.

FIG. 8A is a top plan, schematic view of the drive system and detectors, shown used with a patient having a large cross-section and shown with detectors at a 0° orbit position. Thus, FIG. 8A depicts a starting position of the detectors 170 and 180 at a beginning of a scan for the large patient profile 103A. As the detectors 170 and 180 move along the scanning orbit thereby rotating around the patient, the radial motion of the first detector 170 will be determined by the cam track 167 and cam follower 176 and the radial motion of the second detector 180 will be determined by the extendable rod 192 of the linear actuator 190, such that the camera face 172 of the first detector 170 and the camera face 182 of the second detector 180 follow the profile of the patient's torso with a minimum and constant distance maintained between the camera faces 172 and 182 and the patient's torso.

Figures 8B, 8C, 8D:
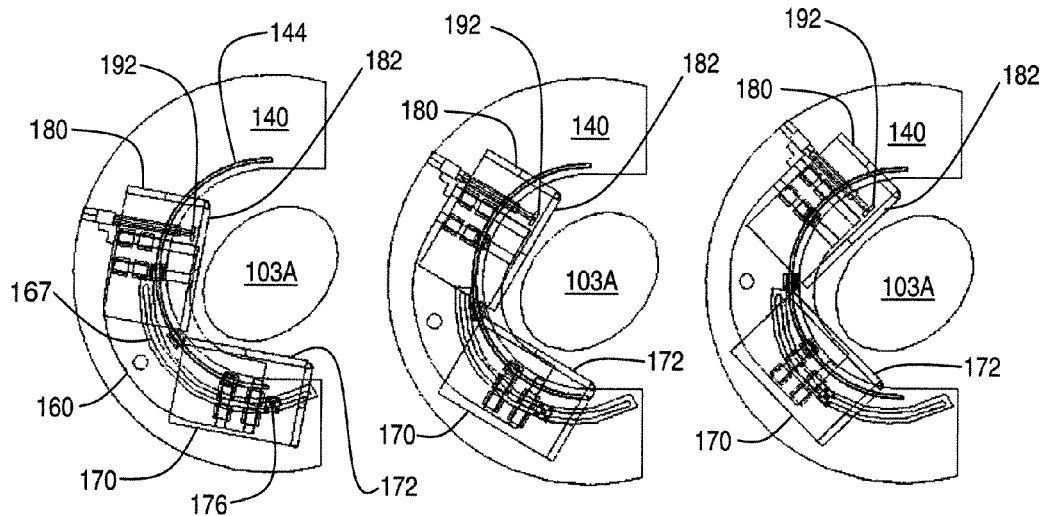
FIG. 8B shows the detectors of FIG. 8A at a 10° orbit position.
FIG. 8C shows the detectors of FIG. 8A at a 30° orbit position.
FIG. 8D shows the detectors of FIG. 8A at a 45° orbit position.
Figures 8E, 8F, 8G:
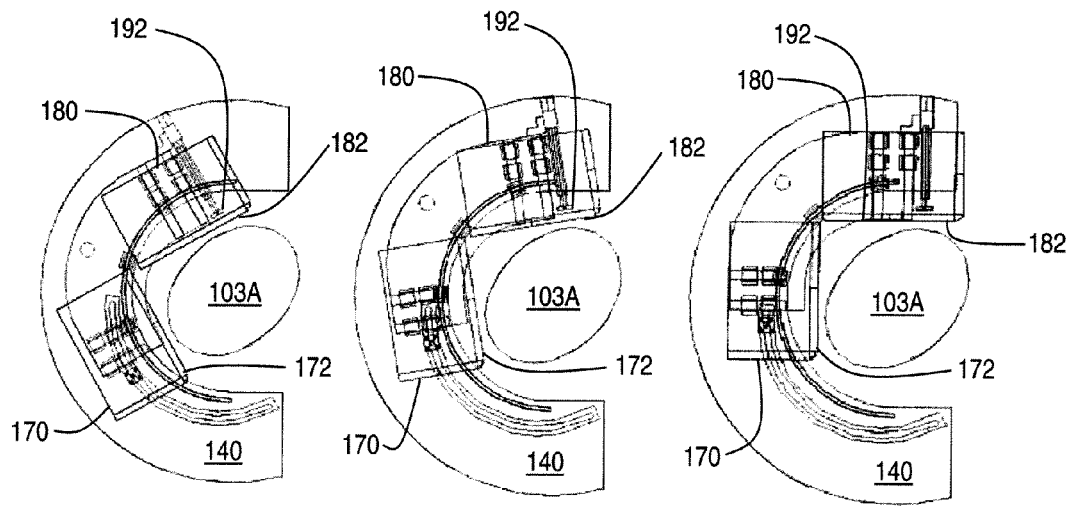
FIG. 8E shows the detectors of FIG. 8A at a 60° orbit position.
FIG. 8F shows the detectors of FIG. 8A at a 80° orbit position.
FIG. 8G shows the detectors of FIG. 8A at a 90° orbit position.

FIG. 8B depicts the detectors 170 and 180 at a 10° orbit position, FIG. 8C shows the detectors 170 and 180 at a 30° orbit position, FIG. 8D shows the detectors 170 and 180 at a 45° orbit position, FIG. 8E shows the detectors 170 and 180 at a 60° orbit position, FIG. 8F shows the detectors 170 and 180 at a 80° orbit position, and FIG. 8G shows the detectors 170 and 180 at a 90° orbit position. Thus, FIGS. 8A-8G show how the detectors 170 and 180 are moved during each pass of the detectors during the scanning procedure at the various orbit angles. Note that the motions of the detectors 170 and 180 are preferably performed as continuous motions throughout the orbit and not as step motions at each orbit angle shown. The motion of the detectors 170 and 180 during the orbit is intended to maintain the detector faces 172 and 182 close to the patient body (represented by ellipse 103A) and consistently at the same distance between the patient body and the detector faces.

FIGS. 8A-8G shows that detectors 170 and 180 move slightly in and out (i.e. toward and away from the patient receiving area 118) depending on the orbit angular position and preferably maintain a constant distance between patient body and the detectors faces 172 and 182. The relative position between the detectors 170 and 180 is also slightly changing, as allowed by the independent suspension of each detector 170 and 180 on linear bearings 166/174 and 168/184, respectively. The length of the linear actuator 190 is changing by extending and retracting extendable arm 192 as well in order to keep the second detector 180 close to the patient's body. The first detector 170 is kept close to the patient's body by the cam track 167 and follower 176. The cam track 167 has an optimized profile that can accommodate any patient size without a meaningful distance variation for the study scan.

Figure 9A:
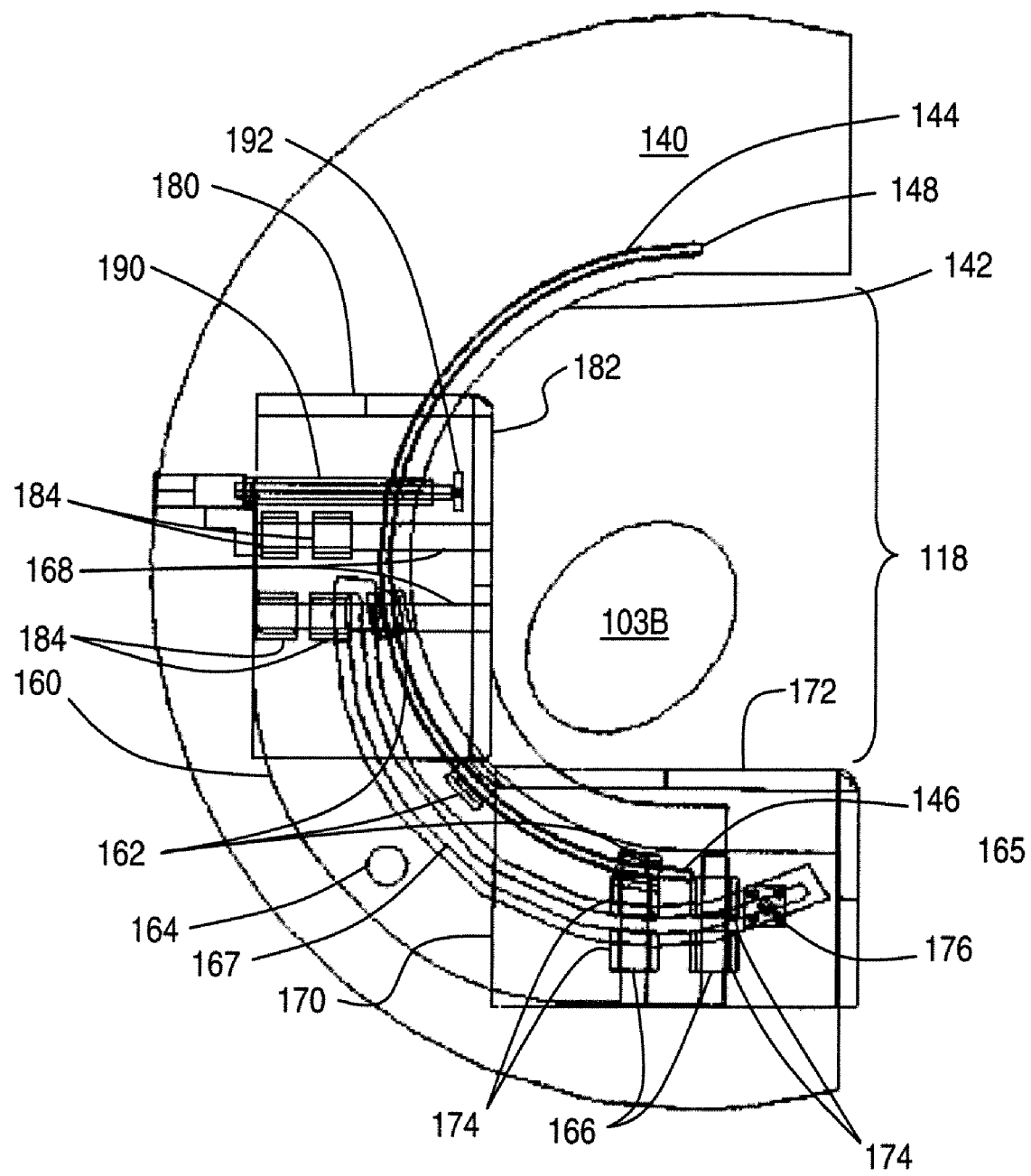
FIG. 9A is a top plan, schematic view of the embodiment of the drive system in FIG. 5, shown used with a patient having a small cross-section and shown with detectors at a 0° orbit position.

FIG. 9A is a top plan, schematic view of the drive system and detectors, shown used with a patient having a small cross-section and shown with detectors at a 0° orbit position. Thus, FIG. 9A depicts a starting position of the detectors 170 and 180 at a beginning of a scan for the small patient profile 103B. As the detectors 170 and 180 move along the scanning orbit thereby rotating around the patient, the radial motion of the first detector 170 will be determined by the cam track 167 and cam follower 176 and the radial motion of the second detector 180 will be determined by the extendable rod 192 of the linear actuator 190, such that the camera face 172 of the first detector 170 and the camera face 182 of the second detector 180 follow the profile of the patient's torso with a minimum and constant distance maintained between the camera faces 172 and 182 and the patient's torso.

Figures 9B, 9C, 9D:
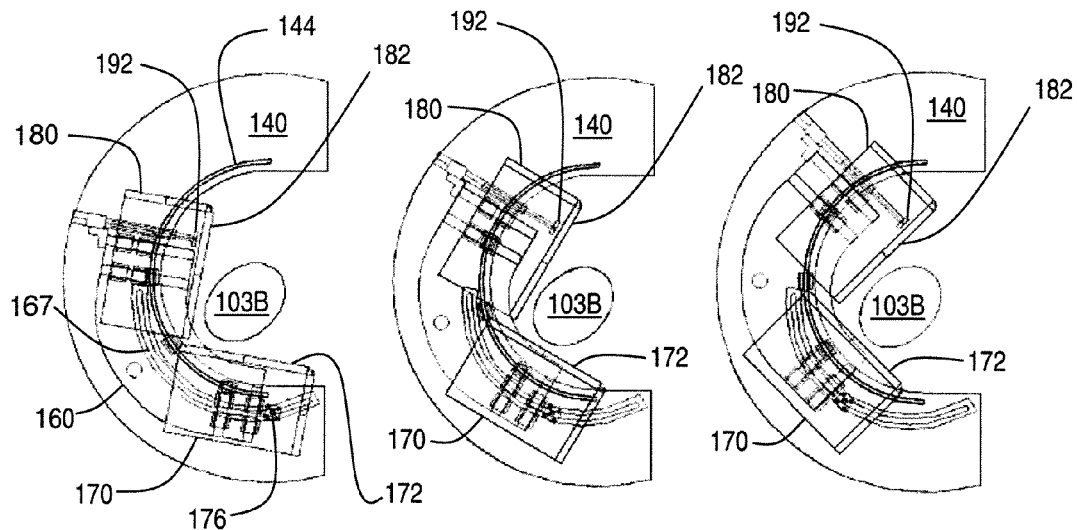
FIG. 9B shows the detectors of FIG. 9A at a 10° orbit position.
FIG. 9C shows the detectors of FIG. 9A at a 30° orbit position.
FIG. 9D shows the detectors of FIG. 9A at a 45° orbit position.
Figures 9E, 9F, 9G:
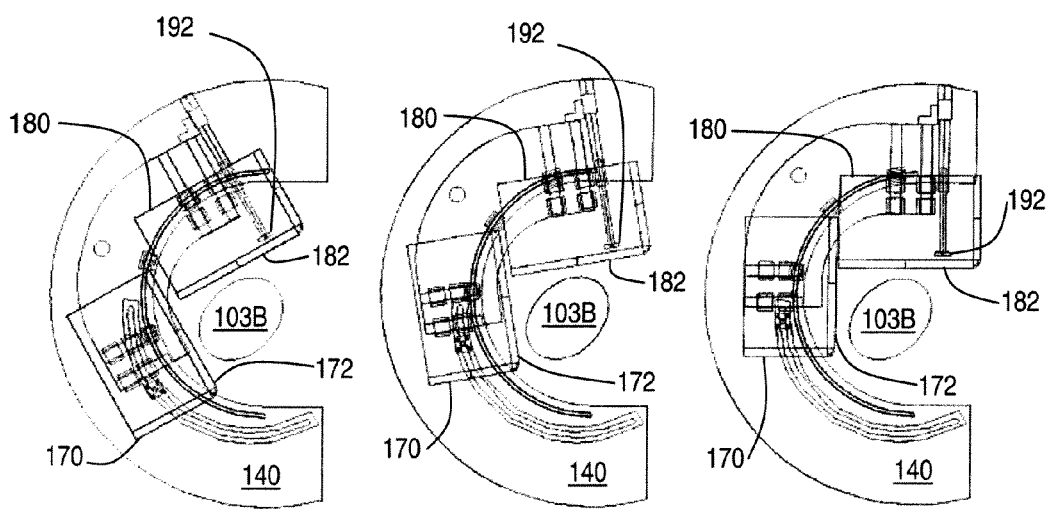
FIG. 9E shows the detectors of FIG. 9A at a 60° orbit position.
FIG. 9F shows the detectors of FIG. 9A at a 80° orbit position.
FIG. 9G shows the detectors of FIG. 9A at a 90° orbit position.

FIG. 9B depicts the detectors 170 and 180 at a 10° orbit position, FIG. 9C shows the detectors 170 and 180 at a 30° orbit position, FIG. 9D shows the detectors 170 and 180 at a 45° orbit position, FIG. 9E shows the detectors 170 and 180 at a 60° orbit position, FIG. 9F shows the detectors 170 and 180 at a 80° orbit position, and FIG. 9G shows the detectors 170 and 180 at a 90° orbit position. Thus, FIGS. 9A-9G show how the detectors 170 and 180 are moved during each pass of the detectors during the scanning procedure at the various orbit angles. The motion of the detectors 170 and 180 during the orbit is intended to maintain the detector faces 172 and 182 close to the patient body (represented by ellipse 103B) and consistently at the same distance between the patient body and the detector faces.

FIGS. 9A-9G shows that detectors 170 and 180 move in and out (i.e. toward and away from the patient receiving area 118) depending on the orbit angular position and preferably maintain a constant distance between patient body and the detectors faces 172 and 182. Unlike in FIGS. 8A-8G, in FIGS. 9A-9G the radial movement of the second detector 180 is significant. At the 90° orbit position in FIG. 9G, the arm 192 of the linear actuator 190 is fully extended, and the second detector 180 is pushed forward (i.e. radially inward towards the patient receiving area 118) all the way such that the detector face 182 remains close to the body of the small patient. The relative position between the detectors 170 and 180 also changes substantially, as allowed by the independent suspension of the detectors 170 and 180 on linear bearings 166/174 and 168/184, respectively. The detectors 170 and 180 overlap each other during most of the orbit. The movement of the detectors 170 and 180 allows both detectors to maintain a minimum distance between their respective detector faces and the patient body. As with the large patient profile, the cam track 167 keeps the first detector 170 close to the small patient profile 103B.

The drive system allows for the adjusting of a scanning travel path of the detectors 170 and 180 when the mounting plate 160 moves about a portion of a perimeter of the patient receiving area 118 depending upon a size of a patient 101 to maintain substantially constant distances between faces 172 and 182 of the detectors and the body of the patient regardless of the size of the patient. The drive system provides independent radial motion for each of the detectors 170 and 180 toward and away from patient receiving area 118.

Figure 10:
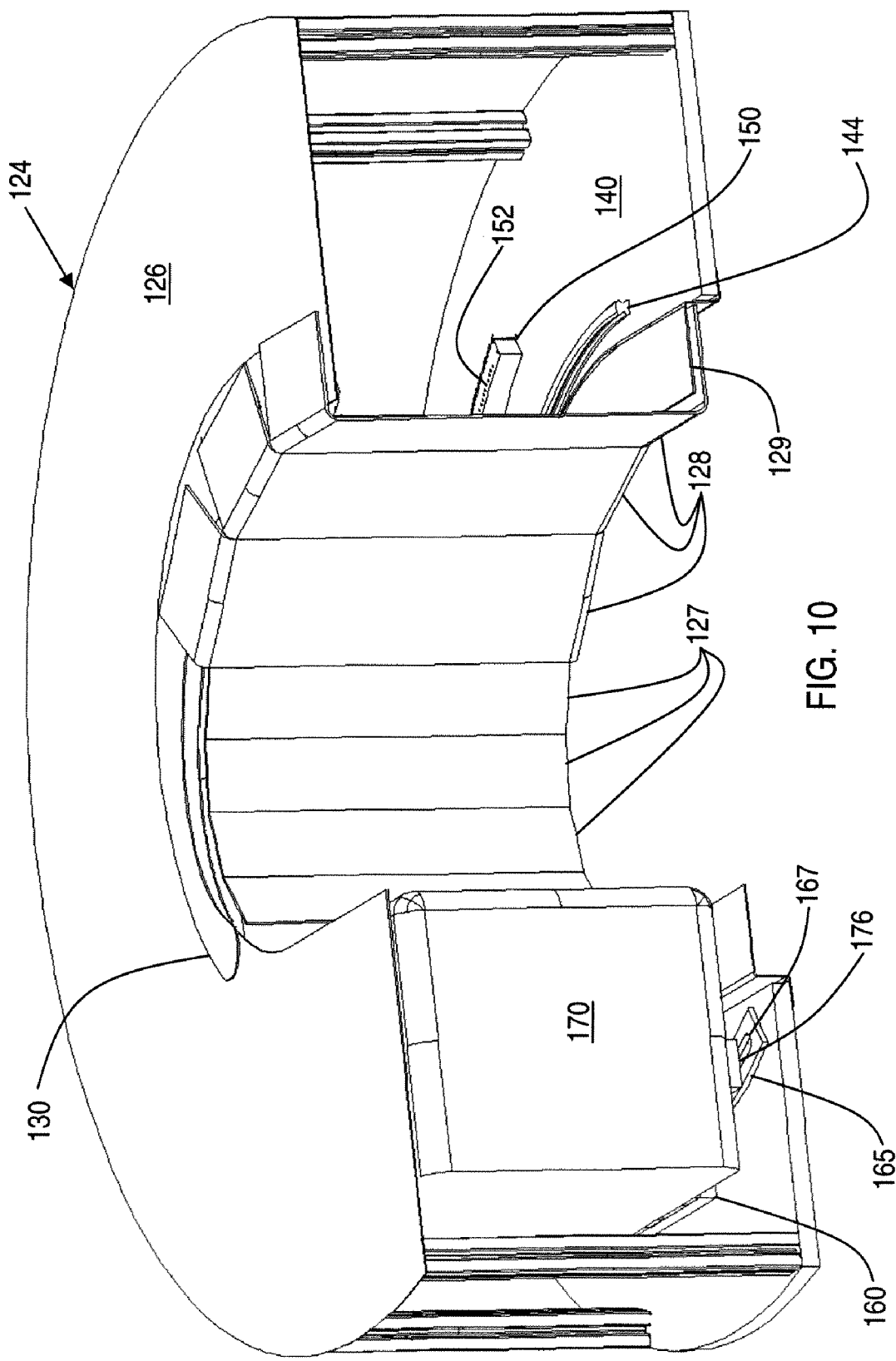
FIG. 10 is a rear perspective, schematic view of an embodiment of a drive system and housing for a cardiac scanner according to an embodiment of the present invention.

FIG. 10 is view of an embodiment of a drive system and housing for a cardiac scanner. The housing 124 depicted in FIG. 10 includes support members 125 provided along an outer periphery of housing 124. The support members 125 connect the base plate 140, which acts as a lower wall of the housing 124, and an upper wall 126. The outer peripheral wall of the housing 124 is removed in FIG. 10 for the sake of clarity. The base plate 140 has an inner lip 129, and various inner peripheral wall segments 127 and 128 extend between an inner periphery of the upper wall 126 and an inner periphery of the inner lip 129 of the base plate 140.

The first set of wall segments 127 are provided along the orbital travel path that corresponds to the travel path of the first detector 170, which travels along a fixed path and therefore does not require movement of the inner peripheral wall segments. Thus, the first set of wall segments 127 can be provided in a fixed position as part of the housing 124. The second set of wall segments 128 are provided along the orbital travel path that corresponds to the travel path of the second detector 180, which travels along a variable travel path depending upon the size of the patient. Thus, the second set of wall segments 128 can pivot inward (e.g., using hinge 130) when the scanner is used to scan a small patient, and pivot outward when the scanner is used to scan a large patient. The second set of wall segments 128 can slide along overlapping lip 129 of the base plate 140 and overlapping inner peripheral edges of the upper wall 126. Thus, the scanner can accommodate any size of patient within the range of small to large body profiles.

The scanner can be provided with either an open enclosure housing configuration where portions of the housing are open, or a closed enclosure housing configuration where all of the components of the scanner are fully enclosed within the housing.

In an open enclosure housing configuration, the motion of the second detector 180 using the actuator 190 can be controlled using sensors (not shown) on the second detector or on mounting plate 160 adjacent the second detector 180 that sense the outline of the patient's body and automatically control the extendable arm 192 of the actuator 190 such that the detector face 182 of the second detector 180 remain at a constant distance form the patient's body during the orbital scanning motion. For example, in such a configuration, a sensor such as a light rail could be provided that extends inward into the patient receiving area 118 and contacts/senses the patient's outline in order to control the motion of the second detector 180 as the orbital scan is performed, or a pre-scan run can be performed to sense and store the patient's outline for use during the scan. Other types of sensors can alternatively be used such as optical sensors, etc.

Alternatively, the motion of the second detector 180 using the actuator 190 can be controlled, for example, using pre-programmed motions input or selected by the operator of the scanner (e.g. a pre-programmed motion for a large sized patient within a certain profile range, a pre-programmed motion for a medium sized patient within a certain range, etc.), and/or using adjustments made by an operator during a pre-scan orbital run. Such motion control can be used for either open or closed housing configurations.

For fully enclosed housing configurations, an inner wall separates the patient from the moving components of the scanner. As discussed above, the embodiment in FIG. 10 includes an inner peripheral wall that includes a first set of fixed wall segments 127 and a second set of movable wall segments 128. The inner peripheral wall is of a hinged sectional design, which can be adjusted, for example, in three increments for small, medium and large patient by moving the movable wall segments 128. The adjustment can be manual using handles (not shown) attached to the movable wall segments 128, or automatic if desired. Once the operator has adjusted the inner peripheral wall to the patient size, the operator selects an appropriate motion depending on the size of the patient, and the second detector 180 is then controlled during orbital motion around the inner peripheral wall within approximately 0.75 to 1 inches therefrom.

The control of the motion of the detectors (e.g., including the operation of the drive device 164 and the operation of the extendable arm 192 of the actuator), the operation of any sensors, and the operation of the detectors can be controlled using a computer, which preferably has input and/or output devices that allow the operator to monitor and control the operation of the scanner.

The use of independent suspensions for each of the detectors provides flexibility used to accommodate patients of different sizes and to minimize the distance between the detector faces and the patient body during the scanning procedure. The scanner can be used to accommodate any desired range of patient sizes.

The embodiment of the scanner described above advantageously uses a semi-circular orbit motion and drive components that are cost efficient from a manufacturing stand point and reliable. The embodiment provides a structure that allows for minimizing distance between the detector faces and the patient body, and can accommodate any patient size to produce a good quality of imaging by enabling a close and consistent scan distance.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A drive system for a scanning device having a first detector and a second detector, said drive system comprising:
   a base;
   a mounting plate movably supported by said base, said mounting plate being configured to movably support the first detector and the second detector;
   a drive device configured to move said mounting plate with respect to said base; and
   a linear actuator configured to move the second detector in a parallel direction with respect to said mounting plate.

2. The drive system according to claim 1, wherein:
   said base is configured to extend about a patient receiving area;
   said base includes a semi-circular guide rail that extends about a first portion of a perimeter of the patient receiving area, said guide rail being substantially semi-circular about the patient receiving area; and
   said mounting plate is configured to slide along said guide rail.

3. The drive system according to claim 2, wherein said drive device is configured to move said mounting plate along said guide rail.

4. The drive system according to claim 3, wherein:
   said mounting plate is configured to movably support the first detector such that the first detector can linearly slide on said mounting plate toward and away from the patient receiving area; and
   said mounting plate is configured to movably support the second detector such that the second detector can linearly slide on said mounting plate toward and away from the patient receiving area.

5. The drive system according to claim 4, further comprising a cam device configured to linearly slide the first detector on said mounting plate toward and away from the patient receiving area as said mounting plate moves along said base, wherein said linear actuator is configured to linearly slide the second detector on said mounting plate toward and away from the patient receiving area.

6. The drive system according to claim 5, wherein:
   said cam device includes a cam track provided on said base;
   said cam track extends about a second portion of the perimeter of the patient receiving area; and
   said cam track is configured to receive and guide a follower provided on the first detector to linearly slide the first detector on said mounting plate.

7. The drive system according to claim 1, wherein:
   said base is configured to extend about a patient receiving area;
   said base and said drive device are configured to move the first detector toward and away from the patient receiving area as said mounting plate moves with respect to said base about a portion of a perimeter of the patient receiving area; and
   said linear actuator is configured to move the second detector toward and away from the patient receiving area.

8. The drive system according to claim 7, wherein:
   said linear actuator is configured to move the second detector along a different scanning travel path as said mounting plate moves with respect to said base about the portion of the perimeter of the patient receiving area depending upon a size of a patient in the patient receiving area; and
   said base and said drive device are configured to move the first detector along a same scanning travel path as said mounting plate moves with respect to said base about the portion of the perimeter of the patient receiving area regardless of the size of the patient received in the patient receiving area.

9. A drive system for a scanning device having a first detector and a second detector, said drive system comprising:
   a base configured to extend about a patient receiving area;
   a mounting plate movably supported by said base, said mounting plate being configured to movably support the first detector and the second detector;
   a drive device configured to move said mounting plate with respect to said base about a portion of a perimeter of the receiving area; and
   means for adjusting a scanning travel path of one or more of the first and second detectors as said mounting plate moves about the portion of the perimeter depending upon a size of a patient to maintain substantially constant distances between a face of each of the first and second detectors and a body of the patient regardless of the size of the patient.

10. The drive system according to claim 9, wherein said means for adjusting is configured to provide independent radial motion for each of the first and second detectors toward and away from patient receiving area.

11. A scanning device comprising:
a base;
a mounting plate movably supported by said base;
a first detector movably supported by said mounting plate;
a second detector movably supported by said mounting plate;
a drive device configured to move said mounting plate with respect to said base; and
a linear actuator configured to move said second detector in a parallel direction with respect to said mounting plate.

12. The scanning device according to claim 11, wherein:
said base is configured to extend about a patient receiving area;
said base includes a semi-circular guide rail that extends about a first portion of a perimeter of the patient receiving area, said guide rail being substantially semi-circular about the patient receiving area; and
said mounting plate is configured to slide along said guide rail.

13. The scanning device according to claim 12, wherein said drive device is configured to move said mounting plate along said guide rail.

14. The scanning device according to claim 13, wherein:
said mounting plate movably supports said first detector such that said first detector can linearly slide on said mounting plate toward and away from the patient receiving area; and
said mounting plate movably supports said second detector such that said second detector can linearly slide on said mounting plate toward and away from the patient receiving area.

15. The scanning device according to claim 14, further comprising a cam device configured to linearly slide said first detector on said mounting plate toward and away from the patient receiving area as said mounting plate moves along said base, wherein said linear actuator is configured to linearly slide said second detector on said mounting plate toward and away from the patient receiving area.

16. The scanning device according to claim 15, wherein:
said cam device includes a cam track provided on said base;
said cam track extends about a second portion of the perimeter of the patient receiving area;
said first detector has a follower provided thereon; and
said cam track is configured to receive and guide said follower to linearly slide said first detector on said mounting plate.

17. The scanning device according to claim 11, wherein:
said base is configured to extend about a patient receiving area;
said base and said drive device are configured to move said first detector toward and away from the patient receiving area as said mounting plate moves with respect to said base about a portion of a perimeter of the patient receiving area; and
said linear actuator is configured to move said second detector toward and away from the patient receiving area.

18. The scanning device according to claim 17, wherein:
said linear actuator is configured to move said second detector along a different scanning travel path as said mounting plate moves with respect to said base about the portion of the perimeter of the patient receiving area depending upon a size of a patient in the patient receiving area; and
said base and said drive device are configured to move said first detector along a same scanning travel path as said mounting plate moves with respect to said base about the portion of the perimeter of the patient receiving area regardless of the size of the patient received in the patient receiving area.

19. A method of scanning a patient, said method comprising:
providing a mounting plate movably supported by a base extending about a patient receiving area;
providing a first detector and a second detector movably supported by the mounting plate;
moving the mounting plate with respect to the base about a portion of a perimeter of the receiving area;
scanning the patient as the mounting plate is moving about the portion of the perimeter of the receiving area; and
adjusting a scanning travel path of one or more of the first and second detectors when the mounting plate moves about the portion of the perimeter depending upon a size of the patient to maintain substantially constant distances between a face of each of the first and second detectors and a body of the patient regardless of the size of the patient.

20. The method according to claim 19, wherein the adjusting of the scanning travel path includes:
independently and radially adjusting the scanning travel path of the first detector and the scanning travel path of the second detector to provide independent radial motion for each of the first and second detectors toward and away from patient receiving area.

21. A method of scanning a patient, said method comprising:
defining a scanning travel path about a patient receiving area;
concurrently moving first and second detectors along the scanning travel path; and
detecting radiation by the first and second detectors as they move along the travel path;
wherein the step of concurrently moving comprises adjusting the positions of the first and second detectors to maintain their respective distances from a body of a patient in the receiving area relatively constant regardless of the size of the patient.

* * * * *